United States Patent
Keeriyadath et al.

(10) Patent No.: US 9,262,351 B2
(45) Date of Patent: Feb. 16, 2016

(54) INTER-ADAPTER COOPERATION FOR MULTIPATH INPUT/OUTPUT SYSTEMS

(71) Applicant: International Business Machines Corporation, Armonk, NY (US)

(72) Inventors: Sangeeth Keeriyadath, Kozhikode (IN); Pruthvi P. Nataraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/226,949

(22) Filed: Mar. 27, 2014

(65) Prior Publication Data

US 2015/0278129 A1    Oct. 1, 2015

(51) Int. Cl.
*G06F 13/12* (2006.01)
*H04L 12/56* (2006.01)
*H04L 12/54* (2013.01)
*G06F 13/18* (2006.01)
*G06F 13/16* (2006.01)

(52) U.S. Cl.
CPC .............. *G06F 13/18* (2013.01); *G06F 13/122* (2013.01); *G06F 13/1663* (2013.01)

(58) Field of Classification Search
CPC ........................... G06F 9/45558; G06F 9/5077
USPC ......................................................... 710/41
See application file for complete search history.

(56) References Cited

U.S. PATENT DOCUMENTS

| | | | |
|---|---|---|---|
| 5,206,936 A * | 4/1993 | Holland et al. | ............... 710/305 |
| 6,453,392 B1 * | 9/2002 | Flynn, Jr. | ...................... 711/151 |
| 6,904,477 B2 | 6/2005 | Padmanabhan et al. | |
| 6,968,401 B2 | 11/2005 | McBrearty et al. | |
| 6,973,529 B2 | 12/2005 | Casper et al. | |
| 7,058,758 B2 | 6/2006 | Allen et al. | |
| 7,076,573 B2 | 7/2006 | Allen et al. | |
| 7,519,744 B2 | 4/2009 | Hayashi et al. | |
| 7,668,981 B1 | 2/2010 | Nagineni et al. | |
| 7,702,962 B2 | 4/2010 | Numanoi | |
| 7,760,626 B2 | 7/2010 | Malpani et al. | |
| 7,793,139 B2 * | 9/2010 | Jain et al. | ........................ 714/4.2 |
| 7,990,994 B1 | 8/2011 | Yeh et al. | |
| 8,041,987 B2 | 10/2011 | Allen et al. | |
| 8,495,412 B2 | 7/2013 | Pafumi et al. | |
| 8,521,922 B2 | 8/2013 | Haustein et al. | |
| 2009/0307690 A1 * | 12/2009 | Logan et al. | ...................... 718/1 |
| 2012/0131379 A1 * | 5/2012 | Tameshige et al. | .......... 714/4.11 |
| 2012/0260121 A1 | 10/2012 | Yadav | |

OTHER PUBLICATIONS

"EMC Powerpath Load Balancing and Failover Comparison with native MPIO operating system solutions", Feb. 2011, White Paper, Abstract, pp. 1-28.
"IBM AIX MPIO: Best practices and considerations", IBM developerWorks, Jan. 20, 2014, pp. 1-8, Copyright IBM Corporation 2014, <http://www.ibm.com/developerworks/aix/library/au-aix-mpio/au-aix-mpio-pdf.pdf>.

(Continued)

*Primary Examiner* — Titus Wong
(74) *Attorney, Agent, or Firm* — Stephen Darrow

(57) ABSTRACT

Dynamically sharing information among a plurality of adapters in a multipath input/output (MPIO) system, selecting one of the adapters to receive an input/output request based on the shared information, and sending the input/output request to that adapter.

18 Claims, 7 Drawing Sheets

(56) References Cited

OTHER PUBLICATIONS

"Multipath I/O Overview", Applies To: Windows Server 2008 R2, provided in search report on Oct. 21, 2013, <http://technet.microsoft.com/en-us/library/cc725907.aspx>.

"Path control module attributes", IBM AIX 7.1 Information Center, Copyright IBM Corporation 1989, 2013, <http://publib.boulder.ibm.com/infocenter/aix/v7r1/index.jsp?topic=%2Fcom.ibm.aix.baseadmn%2Fdoc%2Fbaseadmndita%2Fdevpathctrlmodatts.htm>.

\* cited by examiner

INTER-ADAPTER COOPERATION FOR MULTIPATH INPUT/OUTPUT SYSTEMS

FIELD OF THE INVENTION

The present invention relates generally to the field of data storage, and more particularly to multipath input/output (MPIO) systems.

BACKGROUND OF THE INVENTION

Multipath input/output (MPIO) is a data storage technique involving multiple physical and/or virtual paths between a computing system and its associated mass storage devices. With such an arrangement, one or more multipath software layers can leverage the redundant paths to provide performance-enhancing features such as fault tolerance, load balancing, traffic shaping, automatic path management, and dynamic reconfiguration. For instance, should some device or sub-system along a given path fail, the multipath software layer(s) can route I/O through the remaining devices or sub-systems transparently, with no changes visible to applications other than perhaps incremental latency.

A logical partition, or LPAR, is a subset of a computer's hardware resources, virtualized as a separate computer, or virtual machine (VM). In effect, a physical machine can be partitioned into multiple logical partitions, each hosting a separate operating system. A hypervisor or virtual machine monitor (VMM) is a piece of computer software, firmware, or hardware that creates and runs virtual machines. A computer on which a hypervisor is running one or more virtual machines is a host machine. Each virtual machine is a guest machine. The hypervisor presents the guest operating systems with a virtual operating platform and manages the execution of the guest operating systems. Multiple instances of a variety of operating systems may then share the virtualized hardware resources.

Virtual input/output (VIO), or input/output (I/O) virtualization, abstracts upper-layer protocols from the physical devices of a system and thereby provides the potential to simplify management, lower costs, and improve the performance of those systems. Among the potential benefits of I/O virtualization are: (i) management agility due to the ability to dynamically expand and contract virtual I/O channels via software configuration changes rather than changes to hardware; (ii) reduced costs and/or increased density due to reduced hardware needs; and (iii) increased performance due to the ability to dynamically allocate I/O bandwidth in real time across multiple virtual connections to storage and/or network resources. In at least some implementations, one or more virtual I/O servers (VIOSes) mediate access to the physical resources, while one or more virtual client adapters (VCAs) interface with the VIOSes to provide I/O access to client software. (A controller, or adapter, is a virtual or physical device connecting a virtual or physical computer system to other network and/or storage devices.) I/O virtualization is commonly used with server systems (both real and virtual) operating in enterprise- or cloud-based environments.

SUMMARY

According to one aspect of the present disclosure, there is a computer program product, system and/or method which performs the following actions (not necessarily in the following order and not necessarily in serial sequence): (i) dynamically shares information among a plurality of adapters; (ii) responsive to the shared information, selects a first adapter to receive an input/output request; (iii) responsive to the selection, sends the input/output request to the first adapter.

DETAILED DESCRIPTION

Figure 1:
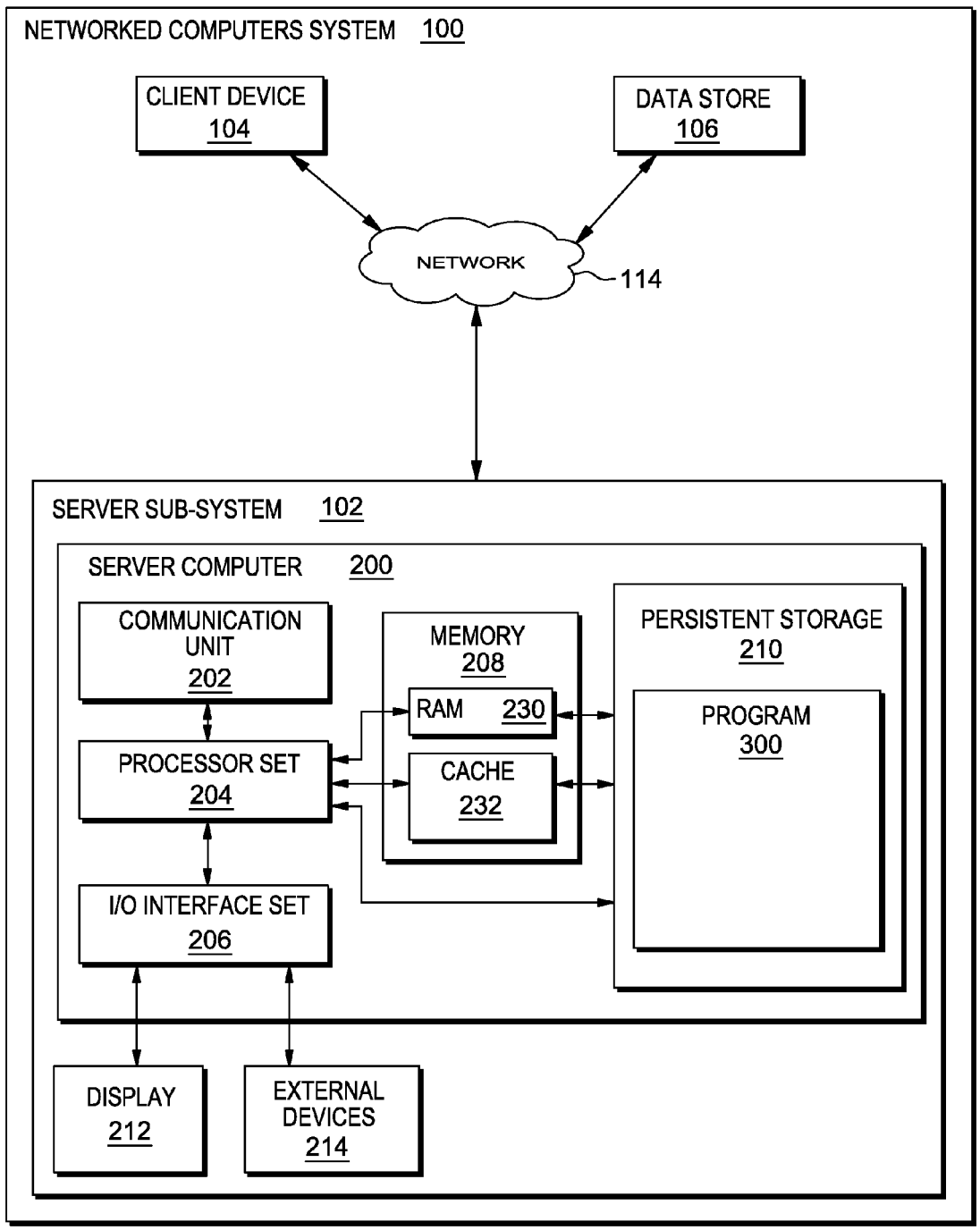
FIG. 1 is a schematic view of a first embodiment of a networked computers system (that is, a system including one or more processing devices) according to the present invention.

Some embodiments of the present invention dynamically share information among adapters in order to improve path selection in multipath input/output systems.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client device sub-system 104; data store sub-system 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the other sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2A:
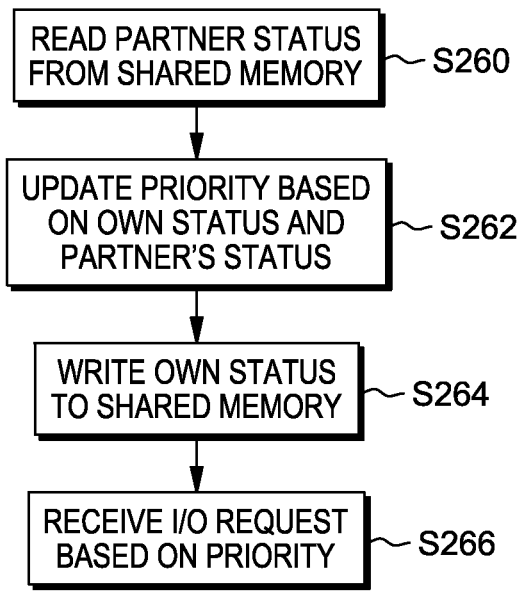
FIG. 2A is a flowchart showing a first process performed, at least in part, by the first embodiment system.
Figure 2B:
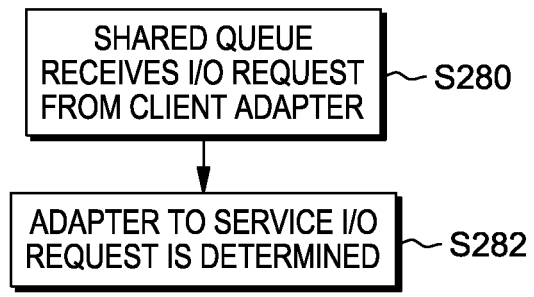
FIG. 2B is a flowchart showing a second process performed, at least in part, by the first embodiment system.
Figure 3:
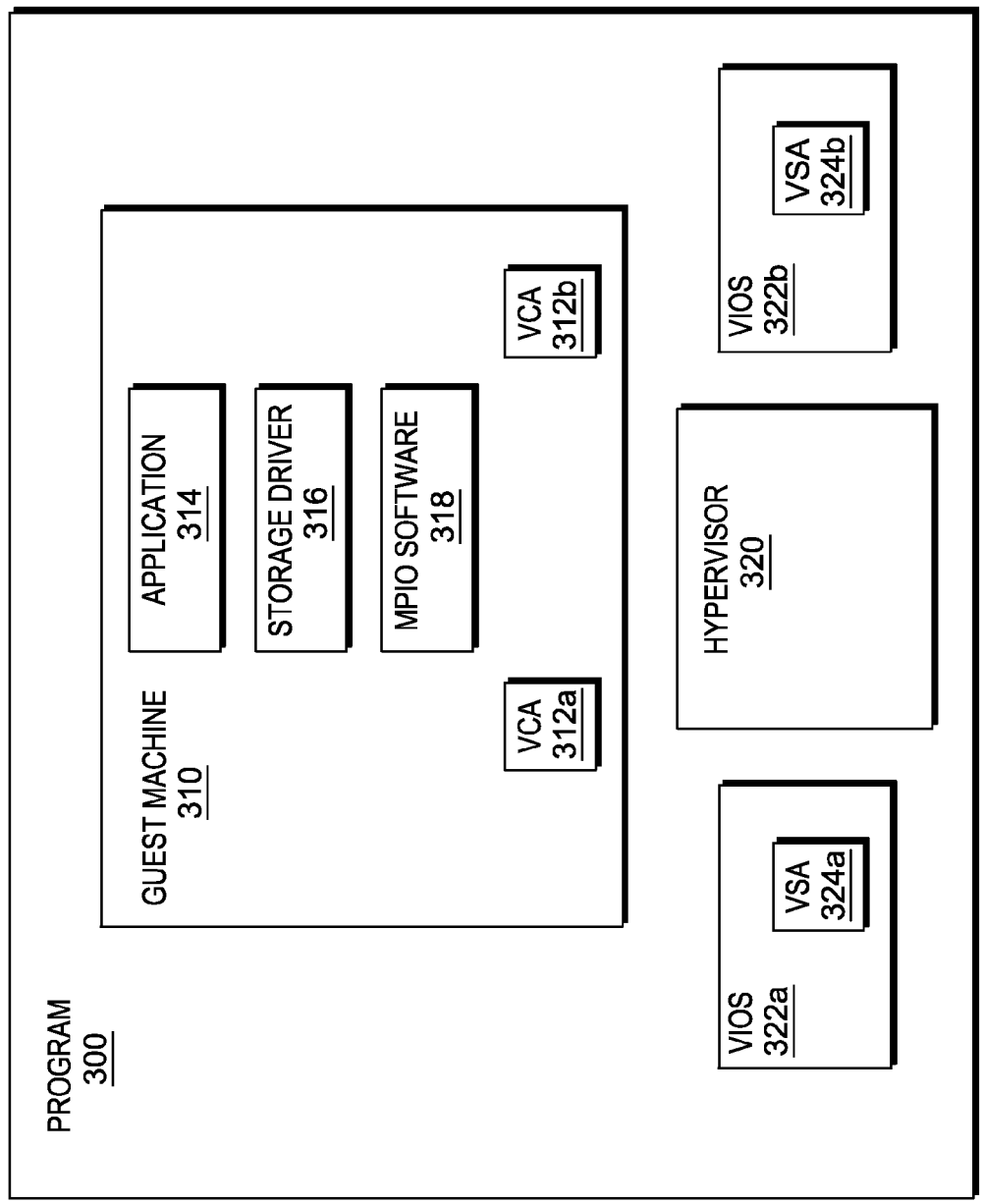
FIG. 3 is a schematic view of a portion of the first embodiment system.

FIGS. 2A and 2B show flowcharts 250 and 270, respectively, each depicting a method according to the present invention. FIG. 3 shows program 300 for performing at least some of the method steps of flowcharts 250 and 270. These methods and associated software will now be discussed, over the course of the following paragraphs, with extensive reference to FIGS. 2A and 2B (for the method step blocks) and FIG. 3 (for the software blocks).

Program 300 in FIG. 3 includes: guest machine 310, including application 314, storage driver 316, multipath input/output (MPIO) software 318, and virtual client adapters (VCAs) 312a and 312b; hypervisor 320; virtual input/output server (VIOS) 322a including virtual server adapter (VSA) 324a; and virtual input/output server 322b including virtual server adapter 324b.

Guest machine 310 and VIOSes 322a and 322b run as virtual machines on hypervisor 320. Guest machine 310 runs server software servicing corresponding client software running on client device 104 (see FIG. 1). Guest machine 310 includes application 314, which passes requests for storage input/output (I/O) to storage driver 316. Because multiple virtual paths exist to data store 106 (see FIG. 1), MPIO software 318 selects one of VCAs 312a and 312b to service each I/O request. Requests are then passed from there to one of virtual server adapters 324a and 324b, which interface with the physical adapters of communication unit 202 of server computer 200 to exchange data between server sub-system 102 and data store 106 (see FIG. 1).

Those of ordinary skill in the art will recognize that numerous variations on this architecture are possible when practicing the teachings of this Detailed Description section. Such variations include but are not limited to: (i) using a virtualized, multipath architecture for I/O between server sub-system 102 and client device 104, similar to that just described for I/O between server sub-system 102 and data store 106; (ii) moving all or part of data store 106 to external device set 214 and applying similar virtualized, multipath architectures to I/O interface set 206; (iii) eliminating some or all of the virtualized components of server computer 200 and/or hypervisor 320 and directly using "real" or physical components instead; and/or (iv) including more or fewer real and/or virtual adapters per client and/or per sub-system. The following description is therefore understood to be for example only and not to be construed as necessarily limited to the particular architecture(s) described.

Focusing on FIG. 2A, processing begins at step S260, where virtual client adapter (VCA) 312a reads information about the status of VCA 312b from a shared block of memory. In this embodiment, the information is limited to: (i) the priority of VCA 312b; and (ii) the number of command failures VCA 312b has experienced in the past 1000 milliseconds. Alternatively or in addition, the information may include the number of command failures over different periods of time, the percentage of command failures over a period of time, average service time, the number of pending commands, queue full status, and/or other information indicating the status of VCA 312b and/or its path to data store 106 (see FIG. 1). Instead of using a shared memory area, other embodiments may share such information between two or more adapters directly.

Processing proceeds to step S262, where VCA 312a compares the status of VCA 312b with its own status, and sets its priority accordingly. For example, if VCA 312a has had two command failures in the past 1000 milliseconds but reads that VCA 312b has had five command failures during the same period of time, it will assign itself a higher priority than VCA 312b because VCA 312b has had more failures. In alternative embodiments, different information and/or different algorithms may be used to make the priority assignments. For example, considering just number of command failures, some embodiments may require a difference that is greater than a particular threshold before changing priorities, may require that change criteria be met for multiple consecutive iterations before a change is made, and/or may assign a priority that reflects not only the ordinal difference between the status of the two VCAs (for instance, "A is greater than B") but also the proportional difference between the status criteria ("A is 50% greater than B"). Those of ordinary skill in the art will recognize that these are only a sample of the many variations that are possible.

Processing proceeds to step S264, where VCA 312a writes its own status information, including its priority, to the shared memory area.

Processing proceeds to step S266, where VCA 312a receives I/O requests from MPIO software 318 based upon its priority. MPIO software 318 selects between VCAs 312a and 312b based upon their relative priorities. If VCA 312a is selected, the I/O request proceeds via VSA 324a; if VCA 312b is selected, VSA 324b is used. MPIO software 318 obtains VCA priority information from the shared memory area. Alternatively, MPIO software 318 may obtain VCA priority information directly from each VCA. MPIO software 318 can be configured to use any of several algorithms to route I/O requests to VCA 312a and 312b, including sending all requests via the higher priority VCA or distributing requests proportionally to their respective priorities, with the higher priority VCA receiving more requests. Other embodiments may include other algorithms.

The above sequence is repeated for each VCA such that MPIO software 318 does not itself need to determine the VCA priorities, and the priorities adapt dynamically as the statuses of their respective VCAs (and/or their respective I/O pathways) change. In some alternative embodiments, one of the VCAs maintains a fixed priority, and therefore does not need the other VCA(s) to provide information to it. Regardless of whether or not one of the VCAs maintains a fixed priority, each request is sent from MPIO software 318 to one VCA, and from that VCA to one VSA. By sharing information and using the shared information to set VCA priority, VCAs 312a and 312b cooperate to share multipath I/O load.

FIG. 2B presents an alternative method that can be employed in this Example Embodiment, though in general, the methods of FIGS. 2A and 2B are designed to be used independently.

For FIG. 2B, processing begins at step S280, where a shared queue receives an I/O request from either VCA 312a or VCA 312b. The shared queue is maintained by hypervisor 320, though other arrangements are possible. The request is placed in the queue.

Processing proceeds to step S282, where either VIOS 322a or VIOS 322b may remove the first item in the queue. This determination is made based upon the next VSA that is ready to accept requests. Alternatively, other factors could be considered, such as traffic type, originating VCA, request size, request priority, time in queue, and so forth. Regardless of the factors considered, each request is sent from one VCA to the shared queue, where it is picked up and processed by one VSA. In this way, VCAs 312a and 312b and VSAs 324a and 324b cooperate to share multipath I/O load.

III. Further Comments and/or Embodiments

Some embodiments of the present disclosure recognize that a typical configuration of a client logical partition has redundant access to the same storage devices via multiple logical and/or physical adapters. Multipath input/output (MPIO) solutions support various algorithms to route traffic across these multiple pathways, including failover, round robin, load balancing, and other distribution mechanisms. Some implementations of MPIO software work along with a disk driver to direct I/O along the multiple possible paths. The various algorithms used for distributing traffic may include, but need not be limited to: (A) choosing paths based on user-provided path priorities and performing round robin allocations to those paths in the ratio of the user-set path priorities; and/or (B) dynamically refining the amount of I/O directed along each path based on the changing service time each path takes to complete I/O operations.

Some embodiments of the present disclosure recognize that the efficiency of the MPIO algorithm chosen could be negated by a poorly chosen path priority attribute of the disk path to the physical/logical adapter (such as when using (A)) or could require costly, advanced versions of MPIO software to dynamically direct I/O (such as when using (B)).

Some embodiments of the present disclosure recognize the following facts, potential problems and/or potential areas for improvement with respect to the above solutions: (i) these solutions can't consider the number of active commands or pending commands in an adapter's queue because this information is private to each adapter; (ii) a better solution than that provided by (B) is needed which also avoids costly MPIO implementations; and/or (iii) a way is needed to set the path priority of each path provided in (A) without manual intervention, particularly in a cloud-based (large-scale) deployment of clients, where manual intervention to set path priorities per disk is a hindrance to automate and can negatively impact efficient usage of the entire deployment.

Some embodiments of the present disclosure recognize that because all I/O is redirected via virtual and/or physical adapter drivers, these drivers have a very good idea of the following details: (i) the amount of time each I/O packet (for example, a Small Computer System Interface (SCSI) command element) takes to get serviced; (ii) the number of active commands (those sent out for service) and pending commands (those yet to be sent out), the number of command failures occurring, and other such details; and/or (iii) the state of their own pending queues, such as whether or not they are full and unable to accept additional I/O commands.

Some embodiments of the present disclosure include a method for load sharing whereby redundant virtual/physical adapters assigned to a client logical partition can communicate among each other and thus can inform each other of details such as those discussed above (service time, number of command failures, pending commands, queue full status, and so on). Equipped with this information, they can then upgrade or downgrade their own or each other's path priorities accordingly. For example, the virtual/physical adapters can modify their priorities in the operating system kernel. The dynamic changes in path priorities by each adapter can then be consumed by the MPIO software sitting above them, which can take these priorities into account to decide on the amount of I/O to be directed to each of the adapters.

In some embodiments of the present disclosure, multiple adapters sitting on the same client partition communicate with each other using a shared piece of memory, where they update useful information such as the average service time taken by the I/O requests each of them services, the number of active commands, the number of pending commands, the number of command failures occurring, and so on, over a periodic interval of time. The adapters mutually use this information to upgrade/downgrade their individual priorities, which they then also update in the same shared piece of memory. The MPIO software sitting on top of the adapters periodically reads the updated priorities from the shared memory and directs I/O to them in the inverse ratio of their priorities (that is, if the highest priority is represented by a "1", an adapter having that priority will be assigned the most I/O traffic).

Such embodiments may include one, or more, of the following features, characteristics and/or advantages: (i) make the MPIO solution better and cheaper; (ii) facilitate communication among virtual/physical adapters; (iii) share information among virtual/physical adapters that help the upper layer(s) to decide on how to prioritize and select the best adapter; (iv) augment existing MPIO solutions with solutions to dynamically set the priority of each virtual/physical adapter path based on interactions with other sister virtual adapters; (v) play an important role in cloud based client deployments where manually changing the attributes of each virtual adapter's path priority is not viable; (vi) play an important role in cloud based client deployments where manually setting the attributes of each virtual adapter's path priority may not be optimal (for example, pre-configured settings); (vii) provide a level of service through the use of default MPIO solutions provided by the operating system comparable to that resulting from the installation of costly MPIO software; (viii) use dynamic information sharing based on inter-adapter communication; and/or (ix) provide for optimal path selection based on inter-adapter communication.

Figure 4:
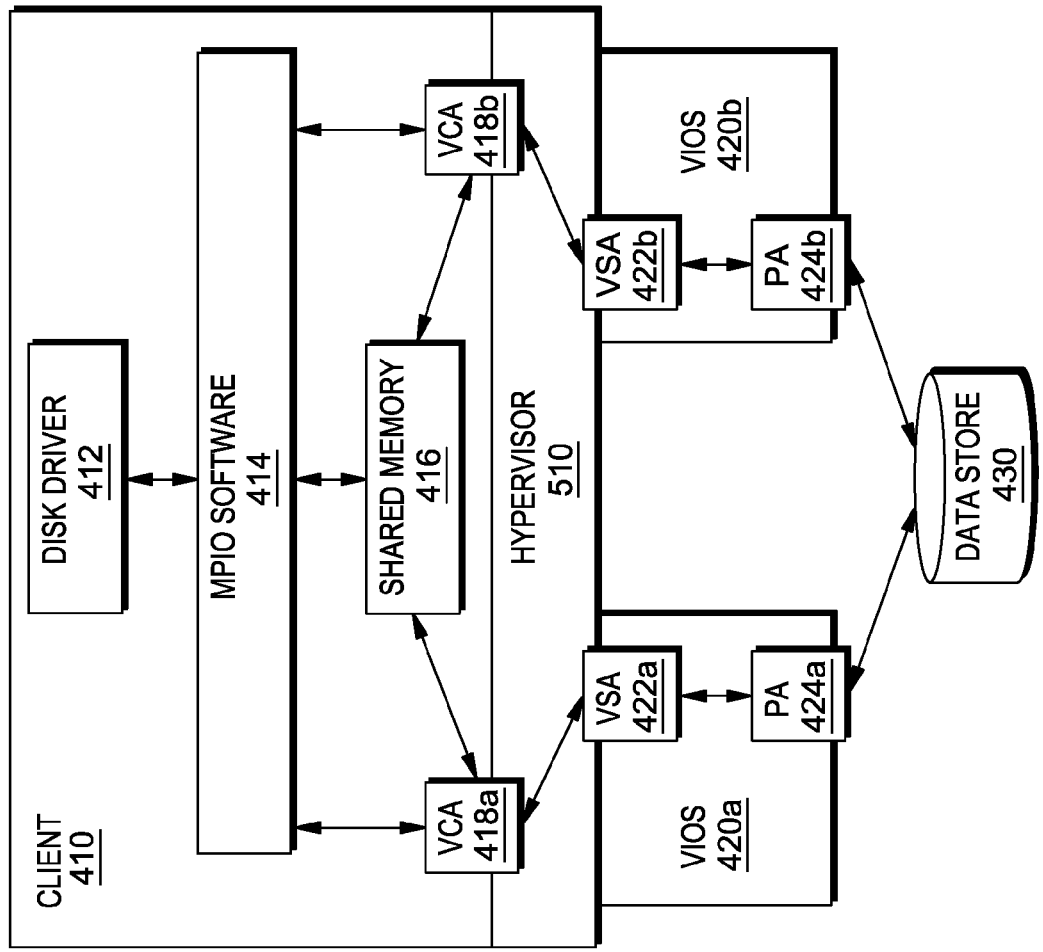
FIG. 4 is a schematic view of a second embodiment system.

Shown in FIG. 4 is diagram 400, illustrating an embodiment of a simple multipath I/O system that uses shared memory for inter-adapter cooperation between two virtual adapters. Diagram 400 includes: client 410, including disk driver 412, multipath I/O (MPIO) software 414, virtual client adapters (VCAs) 418*a* and 418*b*, and shared memory area 416; hypervisor 510; virtual I/O servers (VIOSes) 420*a* and 420*b*, including, respectively, virtual server adapters (VSAs) 422*a* and 422*b*, and physical adapters (PAs) 424*a* and 424*b*; and data store 430. Hypervisor 510 provides interfaces for VCA-to-VSA communication (and vice versa), but is not involved in communication between the VCAs and MPIO software 414 nor between the VCAs themselves.

VCAs 418*a* and 418*b*, which are the heads of the two pathways from client 410 to data store 430, periodically report various metrics about their respective I/O statuses to shared memory area 416. They each then read this information from shared memory area 416, and set their respective priorities based on an analysis of their own reportable metrics relative to the information they discover about their counterpart. They then each write those respective priorities to shared memory area 416.

When an I/O request is generated in client 410, such as from an application (not shown) running on that client, that request is forwarded to disk driver 412. Disk driver 412 in turn forwards the request to MPIO software 414, which selects one of the two paths available to service it. MPIO software 414 makes this selection based on the priorities that VCAs 418*a* and 418*b* wrote to shared memory 416. In this way, the VCAs cooperate to dynamically set their respective priorities, and the MPIO uses these priorities to allocate I/O traffic between the two paths.

The computed priorities need not reside in a shared memory area. Alternatively, they could just be set on each adapter's path-priority attribute. Under such an alternative, the MPIO software could receive each VCA's priority directly from each VCA. Moreover, the general approach depicted in FIG. 4 is scalable in that more than two VCAs could be involved. These multiple VCAs could write/report various metrics to a specific region of a shared memory area, and while calculating their respective priorities, each VCA would consider the reported metrics values of other VCAs on the same client. In the context of shared memory embodiments represented by the example embodiment of FIG. 4, priority is a relative term that can't be determined by a single VCA on its own. For instance, suppose only service time is being considered, and suppose VCA-1 has a currently reported service time of 100 ms and VCA-2 has a currently reported service time of 25 ms. Under these conditions, VCA-2 is currently performing four times better than VCA-1, and their relative priorities should be set accordingly.

Some embodiments of the present disclosure recognize that command response queues (CRQs) connect one VCA to one VSA on one VIOS and that these CRQs therefore have a one-to-one mapping, but that other architectures are possible. Some embodiments of the present disclosure therefore have one VCA connected to two or more VIOSes via a shared command queue (SCQ). A client can post its commands into this shared queue, and one or more of the VIOSes that have registered to the SCQ can pick up these requests and process them.

Some embodiments of the present disclosure recognize that such an arrangement may have one or more of the following features, characteristics, and/or advantages: (i) load sharing more transparent to the client(s); (ii) reduced failover complexity on the client (for example, if one of the VIOS crashes/reboots, another active VIOS will continue to serve the client requests and the client will not see any failover); (iii) high effectiveness in a shared-storage-pool-type environment where there are multiple VIOSes in a cluster and additional CPU overhead is needed (for distributed file operations); (iv) dynamic information sharing based on inter-adapter communication; and/or (v) optimal path selection based on inter-adapter communication.

Figure 5:
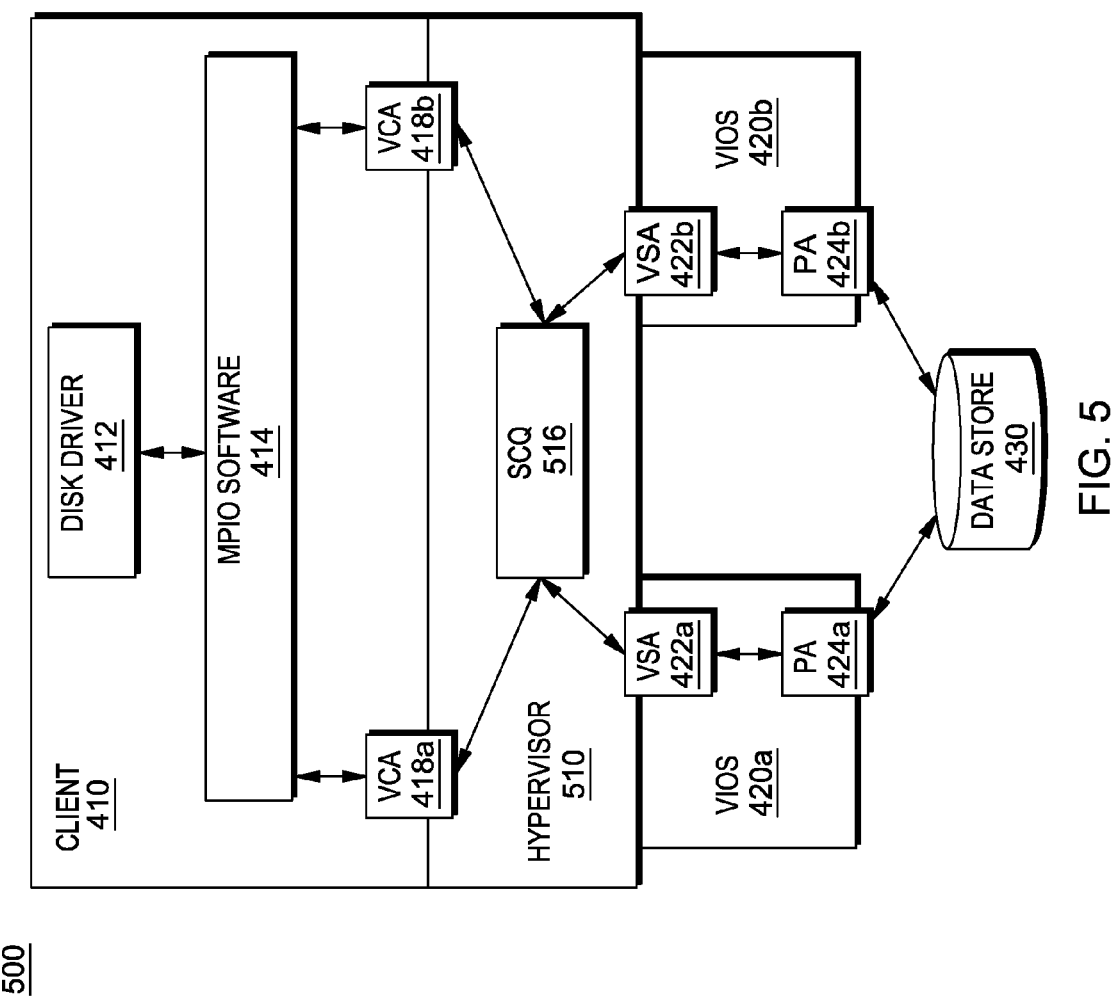
FIG. 5 is a schematic view of a third embodiment system.

Shown in FIG. 5 is diagram 500, illustrating an embodiment of a simple multipath I/O system that uses a shared command queue for inter-adapter cooperation between two virtual adapters. Diagram 500 includes: client 410, including disk driver 412, multipath I/O (MPIO) software 414, and virtual client adapters (VCAs) 418*a* and 418*b*; hypervisor 510 and shared command queue (SCQ) 516; virtual I/O servers (VIOSes) 420*a* and 420*b*, including, respectively, virtual server adapters (VSAs) 422*a* and 422*b*, and physical adapters (PAs) 424*a* and 424*b*; and data store 430.

When an I/O request is generated in client 410, such as from an application (not shown) running on that client, that request is forwarded to disk driver 412. Disk driver 412 in turn forwards the request to MPIO software 414, which selects one of the two VCAs available to service it. Regardless of which VCA is chosen, the request is forwarded to SCQ 516, and picked up by whichever VSA is next ready to accept it. In this way, the VCAs and VSAs cooperate to dynamically allocate I/O traffic between them. As an alternative, in the context of shared queue embodiments represented by the example embodiment of FIG. 5, there is no need to have multiple VCAs or MPIO software, as everything eventually goes to an SCQ before being consumed by one of the VSAs.

Some embodiments of the present disclosure include a method for load sharing whereby virtual server adapters of different virtual I/O servers servicing the same client partition(s) can communicate among themselves. They can do so via the hypervisor, such that each can forward I/O requests of a client partition to another, partner adapter on a different virtual I/O server whenever it is unable to service the request itself (for example, when its pending queue is already full).

Such embodiments may include one, or more, of the following features, characteristics and/or advantages: (i) virtual server adapters on a VIOS are able to identify their partner virtual server adapter(s) which are part of a different VIOS, but servicing the same clients; (ii) achieving the identification of (i) by utilizing services from a hypervisor; (iii) the target virtual server adapter for an I/O command from a client partition, on seeing its state (such as its pending queue being full), can forward the same command to a partner virtual server adapter instead of failing the command back to the client (for example, with a response indicating the device or resource is busy); (iv) dynamic information sharing based on inter-adapter communication; and/or (v) forwarding based on inter-adapter communication.

Some embodiments of the present disclosure recognize the default behavior in cases where a virtual server adapter of a VIOS is unable to serve an I/O command of a client is to fail back the command to the client with a response indicating the device or resource is busy. The client would then (depending upon the MPIO solution) at best have to reissue the same command via the virtual server adapter of the redundant VIOS. Some embodiments of the present disclosure further recognize that this problem of a client having to retry the same command can be solved if the virtual server adapter on the VIOS itself forwards the request to a partner virtual server adapter of a different VIOS whenever it is unable to service the command, and that this solution could play an important role in meeting the service-level agreement (SLA) I/O service times of client partitions in dynamic cloud-based deployments.

In some embodiments of the present disclosure, the hypervisor provides additional support to create a link between the virtual server adapters on two or more VIOSes through a partner adapter queue (PAQ). When one of the VIOSes cannot handle an I/O request (for example when it is overloaded or in an error state), it puts the request on the PAQ of another VSA on a different VIOS. The partner adapter then processes the I/O request and directly responds to the client.

Some such embodiments of the present disclosure may have one or more of the following features, characteristics, and/or advantages: (i) the size of a command response queue element is small (such as 128 bits) so the forwarding operation does not involve significant overhead; (ii) the hypervisor is modified to accommodate partner VSA/VIOS recognition and/or forwarding; and/or (iii) provide significant benefits in a shared-storage-pool-type environment where all VIOSes are clustered and/or where considerable processing is otherwise required for each I/O request.

Figure 6:
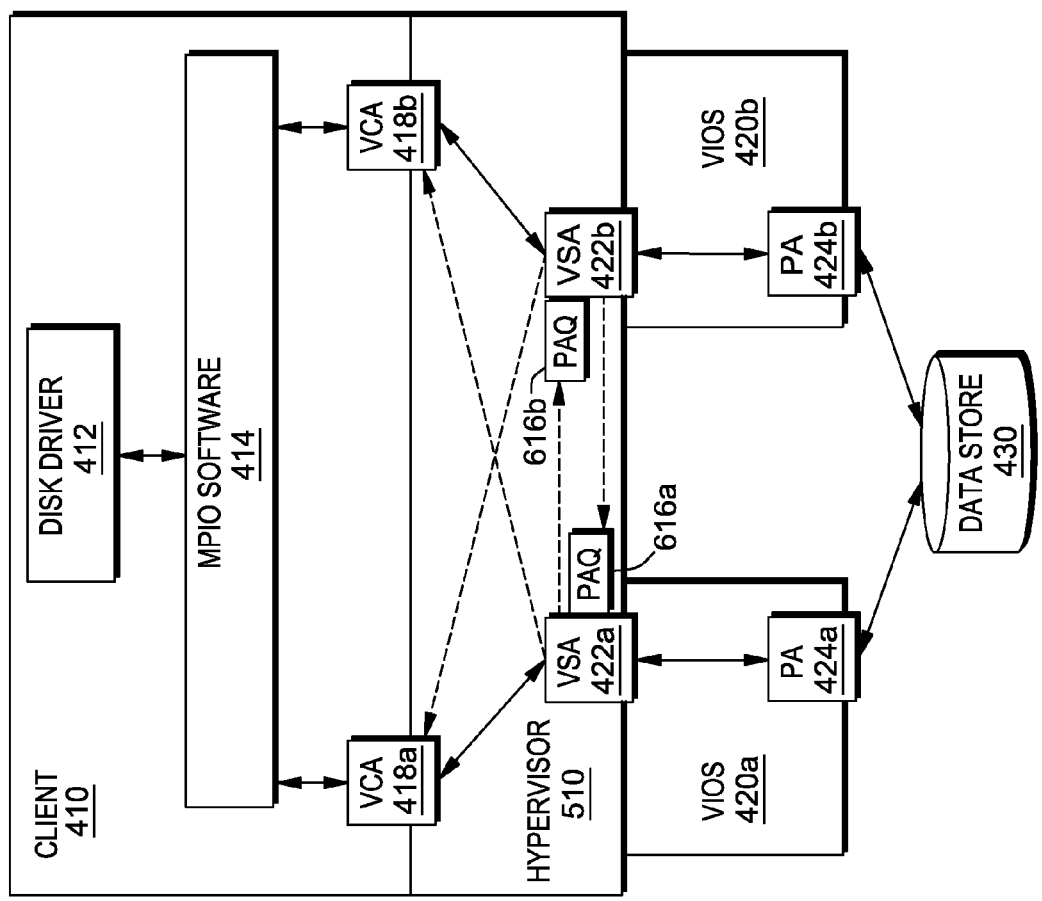
FIG. 6 is a schematic view of a fourth embodiment system.

Shown in FIG. 6 is diagram 600, illustrating an embodiment of a simple multipath I/O system that uses partner adapter queues for inter-adapter cooperation between two virtual adapters. Diagram 600 includes: client 410, including disk driver 412, multipath I/O (MPIO) software 414, and virtual client adapters (VCAs) 418a and 418b; hypervisor 510, including partner adapter queues (PAQs) 616a and 616b; virtual I/O servers (VIOSes) 420a and 420b, including, respectively, virtual server adapters (VSAs) 422a and 422b, and physical adapters (PAs) 424a and 424b; and data store 430.

When an I/O request is generated in client 410, such as from an application (not shown) running on that client, that request is forwarded to disk driver 412. Disk driver 412 in turn forwards the request to MPIO software 414, which selects one of the two VCAs available to service it. Suppose, for example that VCA 418a is selected. VCA 418a then forwards the request to its associated VSA, VSA 422a. Typically, VSA 422a will then service the request through its associated PA, PA 424a. However, if for some reason VSA 422a is unable to service the request in a timely fashion, such as when it is in an error state, it will directly forward the request to PAQ 616b of VSA 422b rather than giving up immediately and returning an error to VCA 418a. VSA 422b will then service the request and respond directly to VCA 418a, from where the request was issued. In this way, the VSAs cooperate to dynamically allocate I/O traffic between them.

Figure 7:
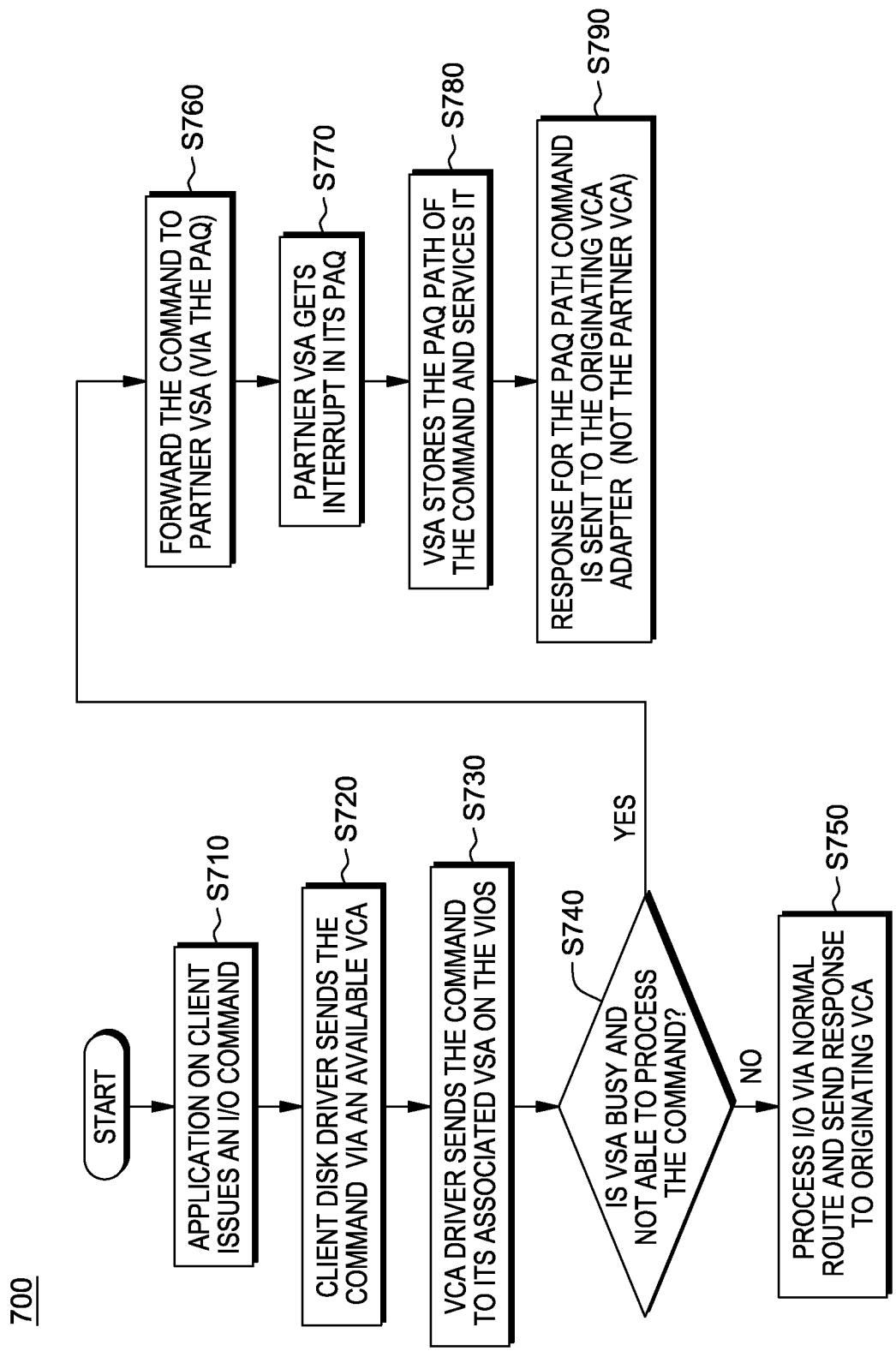
FIG. 7 is a flowchart showing a process performed, at least in part, by a fifth embodiment system.

Shown is FIG. 7 is flowchart 700, which includes steps S710, S720, S730, S740, S750, S760, S770, S780, and S790. Flowchart 700 illustrates the steps followed by another embodiment of a simple multipath I/O system that uses partner adapter queues for inter-adapter cooperation between two virtual adapters. In step S710, an application on a client issues an I/O command. In step S720, the client disk driver sends the command via an available VCA. In step S730, the VCA driver sends the command to its associated VSA on its associated VIOS. In step S740, the VSA determines whether or not it is busy or otherwise unable to process the command. If it can process the command, it does so via the normal route and sends its response to the originating VCA in step S750. If it cannot, it forwards the command to a partner VSA via a partner adapter queue in step S760. The partner VSA then gets an interrupt in its PAQ in step S770. The partner VSA stores the PAQ path of the command and services it in step S780. Finally, the partner VSA sends a response for the PAQ path command to the originating VCA adapter (not the partner VCA) in step S790.

Some embodiments of the present disclosure may include one, or more, of the following features, characteristics and/or advantages: (i) two or more virtual or physical adapters on any system communicating among themselves to share information with each other and with the MPIO software running on the system; (ii) two or more virtual server adapters on a VIOS and/or hypervisor communicating with each other to share the workload among themselves; (iii) server adapters on VIOSes communicating with each other to forward I/O commands to one another; (iv) inter-adapter communication among clients; (v) a shared common queue shared by multiple VIOSes; (vi) communication among adapters; (vii) adapters that take multiple factors into account when setting their priorities; (viii) adapters that use various algorithms for setting their priorities; (ix) client adapters on any system communicating among themselves to share information with each other and with the MPIO software running on the system; (x) client adapter(s) sending commands to a common queue shared by multiple VIOSes such that one of the VIOSes can pick up an I/O request from the shared common queue and service it; (xi) the ability of adapters to communicate among each other in a fashion that does not require changes to MPIO software; (xii) the ability for adapters to communicate among each other such that they can inform each other of details such as service time, number of command failures, pending commands, and/or queue full status, and to upgrade/downgrade their "path priorities" accordingly; (xiii) improved efficiency of routing I/O commands to an efficient path (where path efficiency is calculated based on one or more of the parameters listed in (xii)); (xiv) a shared command queue (SCQ) in the hypervisor, which is beyond the scope of MPIO software residing on the operating system; (xv) improved I/O throughput without changes to MPIO software; (xvi) client adapters that communicate with their partner adapters and share information among each other to upgrade/downgrade their individual priorities; (xvii) client adapters that communicate with their partner adapters and share information among each other to upgrade/downgrade their individual priorities such that round-robin and other simple MPIO algorithms can benefit from these settings; (xviii) reduction of the time lag that is incurred because of sending I/O commands from a VIOS adapter back to the client, which then reprocesses/resends the commands via its disk driver; (xix) virtual host (vhost) adapters on VIOSes that recognize (such as with the help of a hypervisor) their partner vhost(s) on one or more other VIOS; and/or (xx) a first vhost that can forward a command to a second vhost (such as when the first vhost it is unable to service it itself).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Forwarding: the transfer of information between two components having redundant functionality with respect to their purpose in the system; includes information transfer between redundant virtual client adapters (VCAs) and between redundant virtual server adapters (VSAs).

Sending: the transfer of information other than by forwarding; includes information transfer from a component filling one functional role to a component filling a non-redundant functional role in a system, such as information transfer between a virtual client adapter (VCA) and a virtual server adapter (VSA), between a virtual client adapter (VCA) and a shared queue, between a virtual server adapter (VSA) and a shared queue, or between physical adapters connected to different physical devices; excludes information transfer between two components with redundant functionality with respect to their purpose in the system, such as VCA-to-VCA or VSA-to-VSA communications where the VCAs or VSAs are part of redundant input/output pathways.

Sharing: with respect to a location or data structure, a location or data structure accessible by more than one redundant component of a system, such as by two or more VCAs or by two or more VSAs that provide redundant access to an input/output pathway.

Adapter: a virtual or physical computer device that connects a computer system to other network and/or storage devices; includes but is not necessarily limited to devices commonly known as host controllers, host adapters, host bus adapters (HBAs), network interface controllers (NICs), and/or converged network adapters.

What is claimed is:

1. A method comprising:
dynamically sharing information between or among a plurality of adapters in a multipath input/output system;
responsive to the shared information, selecting, from the plurality of adapters in the multipath input/output system, a first adapter to service an input/output request for transferring data from a source to a destination; and
responsive to the selection, sending the input/output request to the first adapter;
wherein:
each adapter in the plurality of adapters lies along one or more paths between the source and the destination; and
the adapters in the plurality of adapters provide mutually exclusive alternatives for servicing the input/output request.

2. The method of claim 1 wherein the shared information includes status information of the adapters in the plurality of adapters.

3. The method of claim 1 wherein the shared information includes a shared queue that contains the input/output request.

4. The method of claim 1 wherein the adapters in the plurality of adapters are virtual adapters.

5. The method of claim 2 further comprising:
computing an adapter priority for the first adapter based, at least in part, on the shared status information.

6. The method of claim 5 wherein the shared status information includes the computed adapter priority.

7. A computer program product comprising a non-transitory computer readable storage medium having stored thereon:
first program instructions programmed to dynamically share information between or among a plurality of adapters in a multipath input/output system;

second program instructions programmed to, responsive to the shared information, select, from the plurality of adapters in the multipath input/output system, a first adapter to service an input/output request for transferring data from a source to a destination; and third program instructions programmed to, responsive to the selection, send the input/output request to the first adapter;

wherein:

each adapter in the plurality of adapters lies along one or more paths between the source and the destination; and the adapters in the plurality of adapters provide mutually exclusive alternatives for servicing the input/output request.

8. The product of claim 7 wherein the shared information includes status information of the adapters in the plurality of adapters.

9. The product of claim 7 wherein the shared information includes a shared queue that contains the input/output request.

10. The product of claim 7 wherein the adapters in the plurality of adapters are virtual adapters.

11. The product of claim 8 having further stored thereon:

fourth program instructions programmed to compute an adapter priority for the first adapter based, at least in part, on the shared status information.

12. The product of claim 11 wherein the shared status information includes the computed adapter priority.

13. A computer system comprising:

a processor(s) set; and a computer readable storage medium;

wherein:

the processor set is structured, located, connected and/or programmed to run program instructions stored on the computer readable storage medium; and the program instructions include:

first program instructions programmed to dynamically share information between or among a plurality of adapters in a multipath input/output system;

second program instructions programmed to, responsive to the shared information, select, from the plurality of adapters in the multipath input/output system, a first adapter to service an input/output request for transferring data from a source to a destination; and third program instructions programmed to, responsive to the selection, send the input/output request to the first adapter;

wherein:

each adapter in the plurality of adapters lies along one or more paths between the source and the destination; and the adapters in the plurality of adapters provide mutually exclusive alternatives for servicing the input/output request.

14. The system of claim 13 wherein the shared information includes status information of the adapters in the plurality of adapters.

15. The system of claim 13 wherein the shared information includes a shared queue that contains the input/output requests.

16. The system of claim 13 wherein the adapters in the plurality of adapters are virtual adapters.

17. The system of claim 16 wherein the program instructions further include:

fourth program instructions programmed to compute an adapter priority for the first adapter based, at least in part, on the shared status information.

18. The system of claim 17 wherein the shared status information includes the computed adapter priority.

* * * * *